Figure 1:
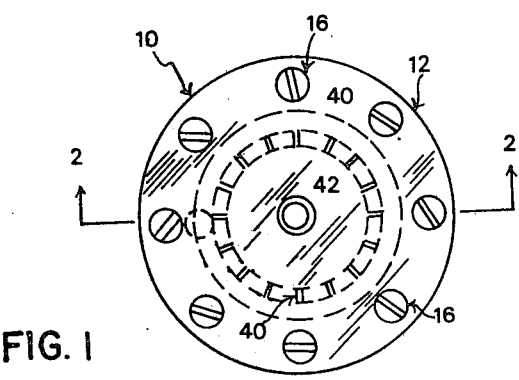

United States Patent [19]

Booth et al.

[11] 4,302,223
[45] Nov. 24, 1981

[54] AIR REMOVAL DEVICE

[75] Inventors: Franklin W. Booth, Hampton; Robert A. Bruce, Newport News, both of Va.

[73] Assignee: The United States of America as represented by the Administrator of the National Aeronautics and Space Administration, Washington, D.C.

[21] Appl. No.: 662,181

[22] Filed: Feb. 27, 1976

Related U.S. Application Data

[63] Continuation of Ser. No. 810,576, Mar. 26, 1969, abandoned.

[51] Int. Cl.³ .......................................... B01D 53/22
[52] U.S. Cl. .................................. 55/158; 210/321.1
[58] Field of Search ................. 55/158, 159; 210/321

[56] References Cited

U.S. PATENT DOCUMENTS

| 2,756,206 | 7/1956 | Gobel | 210/321 A |
| 3,415,038 | 12/1968 | Merten et al. | 55/158 X |
| 3,523,408 | 8/1970 | Rosenberg | 55/159 |

*Primary Examiner*—John Adee
*Attorney, Agent, or Firm*—Howard J. Osborn; John R. Manning

[57] ABSTRACT

This disclosure concerns a device suitable for removing air from water under both zero and one "g" gravity conditions. The device is comprised of a pair of spaced membranes, one being hydrophobic and the other being hydrophilic. The air-water mixture is introduced into the space therebetween, and the selective action of the membranes yields removal of the air from the water.

3 Claims, 2 Drawing Figures

AIR REMOVAL DEVICE

ORIGIN OF THE INVENTION

The invention described herein was made by employees of the U.S. Government and may be manufactured and used by or for the Government for governmental purposes without the payment of any royalties thereon or therefor.

This is a continuation of application Ser. No. 810,576 filed Mar. 26, 1969, now abandoned.

Life support and other systems incorporated into manned spacecraft have many points within which water is formed, each such point creating the possibility of mechanical infiltration or dissolving of air in the water system. The frequent changes in water stream pressure and/or temperature may result in dissolved air being released, and a significant quantity of air bubbles may collect in the system. This air may produce a deterioration in performance in some subsystems, such as electrolysis units, wherein it may displace the electrolyte, or in holding tanks where collection of air would cut down on the usable volume of the tanks.

This air must be bled back to the cabin atmosphere under zero gravity conditions, and for ground testing purposes, any air bleeding device used must operate under zero gravity conditions.

Therefore, it is an object of the present invention to provide an air separating device which will remove dissolved or entrained air from a water stream under zero or one "g" gravity conditions.

This object is attained by the use of a pair of porous membranes, one water-wettable or hydrophilic and the other nonwettable or hydrophobic. Introducing the air-water mixture under pressure between these membranes produces a separation due to the selective passage of air and water through the membranes.

Figure 2:
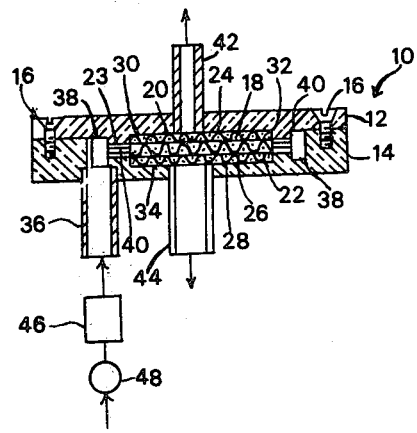

The specific embodiment disclosed to illustrate the invention may be better understood by reference to the drawings wherein FIG. 1 is a plan view of the air separation device and FIG. 2 is a view of the section taken along the line 2—2 in FIG. 1.

Referring to FIG. 2, the device is indicated as 10 and includes a housing made up of a pair of plates 12 and 14 fastened together by screws 16 and sealed about their periphery by an appropriate sealing compound. A cavity 18 is formed between these plates 12 and 14 by cut out portions in the inner face of each plate.

Occupying this cavity are a pair of porous membranes 20 and 22 secured about their periphery with a spacer 23 and three sheets of woven mesh 24, 26 and 28 which serve to position the membranes and have another function to be hereinafter described. The membranes are constructed so that membrane 20 is hydrophobic while membrane 22 is constructed so as to be hydrophilic. Such membranes are widely available and well known in the prior art and may be made of a wide variety of materials with a wide variety of surface treatments to obtain these characteristics.

These characteristics of the membranes will serve to create a selective barrier as the water will not pass through the pores of the nonwettable membrane 20 due to negative capillary forces, as long as the pressure differential motive force across the barrier is lower than the negative capillary force. For this purpose, it has been found that for a typical nonwettable material having 0.45 micron pores a pressure difference of 6 psi between inlet and exhaust air produced satisfactory selective passage of the air with no water transfer. Of course, variances in pore size and the contact angle of the material with the water would vary this value.

On the other hand, since the water is attracted to the membrane 22, the pores will be occupied by the water, and no air can pass through.

These membranes divide the cavity 18 into three chambers 30, 32 and 34.

Central chamber 34 serves to admit the air-water mixture and bring it into contact with the membranes, with the screen 26 causing the air bubbles therein to be brought into contact with the membrane 20. The air-water mixture is introduced from the source via tube 36, and enters the annular chamber 38. From thence the air passes into the central chamber 32 via openings 40 through spacer 23. The air passes through the membrane 20, and is collected by the screen 24 and passes into exhaust tube 42, while the water passes through the membrane 22, is collected by the screen 28 and passes out the tube 44.

In order to remove dissolved air from the water, a degassing device 46 may be placed upstream from the device, which may either heat the water to drive out the air and create bubbles or may reduce the pressure of the water also producing air bubbles from dissolved air coming out of solution. Thus, the device may also operate to remove both entrained and dissolved air.

In order to create flow across the membranes, a pressure differential must be set up, that is the pressure in chamber 32 must be greater than that in chambers 30 and 34, and a pump 48 upstream might be necessary depending on the application and the nature of the system incorporating the device.

In describing the specific embodiment a specific arrangement has been described for the sake of clarity but it is understood the invention may be practiced in other forms without departing from the spirit thereof.

What is claimed as new and desired to be secured by Letters Patent of the United States is:

1. A separator device for separating a mixture of gas entrained in water comprising:
    a hydrophilic porous membrane;
    a hydrophobic porous membrane;
    enclosure means forming a fluid chamber including portions of said membranes and means spacing said membranes parallel to each other including a spacer member extending around said portions;
    input means for directing said mixture to said chamber and including a chamber extending about the spacer and also including a plurality of openings extending through said spacer into the fluid chamber;
    means for creating a pressure differential across said portion of said hydrophilic porous membrane so as to cause outward flow of said water; and
    means for creating a pressure differential across said portion of said hydrophobic porous membrane and for creating an outward movement of said gas without overcoming the negative capillary forces which form a water barrier, whereby selective transfer of gas and water through said portions produces separation of said mixture in both zero g and one g environments.

2. A separator device for separating a mixture of a gas entrained in a liquid comprising:
    a hydrophilic porous membrane;
    a hydrophobic membrane;

enclosure means forming a fluid chamber including portions of said porous membranes spaced adjacent and parallel to each other;

input means for directing said mixture to said chamber;

means for creating a pressure differential across said portion of said hydrophilic porous membrane so as to cause outward flow of said liquid;

means for creating a pressure differential across said portion of said hydrophobic porous membrane so as to create an outward movement of said gas without overcoming the negative capillary forces acting on said gas;

means positioned between said porous membranes for bringing said mixture into contact with said membranes whereby selective transfer of gas and water through said portions produces separation of said mixture in any environment including space.

3. The separator of claim 2 wherein said means positioned between said porous membranes is a screen.

* * * * *